United States Patent Office 3,053,655
Patented Sept. 11, 1962

3,053,655
PHOTOGRAPHIC MATERIAL AND PROCESS
Paul D. Dreyfuss, Cincinnati, Ohio, and Bela Gaspar, Beverly Hills, and Gustave B. Linden, Pasadena, Calif., assignors, by direct and mesne assignments, to Minnesota Mining and Manufacturing Company, St. Paul, Minn., a corporation of Delaware
No Drawing. Filed Oct. 24, 1955, Ser. No. 542,492
12 Claims. (Cl. 96—20)

This application is a continuation-in-part of U.S. application Serial No. 137,288, filed January 6, 1950, now abandoned.

This invention relates to color photography, and particularly to a photographic material containing azo dyes.

Processes of color photography depending upon the decolorization of dyes in the presence of metallic silver are well known. A process of this type in which azo dyes are employed in multilayer coatings to produce colored images by bleaching the dyes in the presence of silver images is disclosed in a number of patents, e.g., U.S. Patent 2,020,775. In this process, azo dyes are uniformly distributed in photographic colloids, preferably gelatin-silver halide emulsions, and these are coated on a transparent or opaque support. The material is exposed and developed, and is then subjected to the action of a bath which destroys the dye locally in the presence of the metallic deposit of the photographic image. This results in the production of a dye image which is reversed with respect to the metal image. Suitable baths to destroy the azo dyes in the presence of metal deposits are disclosed, e.g., in U.S. Reissue Patent No. 22,308.

A loss in color sensitivity is noted whenever a photographic emulsion layer is colored with a dye which absorbs at a wavelength to which said layer or a layer lying beneath is sensitized. Methods to overcome this loss in sensitivity are well known. One method consists in replacing the azo dyes with colorless compounds which are converted into azo dyes after the exposure to light.

According to the present invention, the azo dyes to be incorporated in a light sensitive photographic material are selected among those azo dyes which exist in at least two differently colored forms, depending on the pH of the medium.

It is therefore an object of the present invention to produce photographic layers containing azo dyes which transmit, during exposure to light, at the wavelengths to which said layers or the layers lying beneath are sensitive (referred to as "the critical wavelengths" in the following) and to adjust, during processing, the reaction of the vehicle in order to shift the color of said azo dyes in the finished image.

Another object of the invention is the provision of a novel process for producing a photographic dye image or a multicolor photographic dye image in a photographic light sensitive material containing azo dyes, whereby a minimum loss of color sensitivity occurs in the emulsion layers colored wth said azo dyes.

Other objects will appear from the following description of our invention:

The present invention resides in the incorporation in a light sensitive silver halide emulsion sutable for use in a dye bleach process, of a pH sensitive azo dye in the transmitting form which dye is convertible to to an absorbent form at another pH. In carrying out the invention process, the photographic material is exposed while the layers containing pH sensitive dyes are at a pH at which the dyes are transmittant with respect to light of the spectral region to which the layers containing the dyes are sensitive, forming dye images, and at a point after the exposure simply adjusting the pH of said layers to the pH at which said dyes are absorbent to the light waves for which such layers were sensitive during exposure. Preferably, azo dyes are employed which transmit the light of the critical wavelengths at low pH and absorb at high pH, employing alkaline buffering baths such as sodium carbonate solution to transform the pH sensitive dye to the absorbing form.

Many azo dyes are known, the colors of which depend on the pH of the vehicle. In the case of the azo dyes having a sulfonic or carboxylic acid function this color change might be due to the fact that the free dye acid is colored differently from the salts of said azo dye acid. In other cases it was suggested that the "acid form" of an azo dye be an addition product of one mol of an acid to the azo group of the azo dye. Whatever the theory might be, we regard the "acid form" of azo dye to be still azo dyes; i.e., we consider all reversible color changes of azo dyes which are due to a pH-change of the medium, to fall within the limits of the present invention. A change in color intensity such as a change from a weakly yellow to a strongly yellow color is regarded a color change.

We realize that it is known (see Carroll, U.S. 2,304,884) to treat azo dyes for use in color photography so that their absorption maxima are shifted from the region of maximum sensitivity of the layers in which they are incorporated and, after exposure, to reconvert the dyes to dyes having the proper colors for image dyes. This, however, is accomplished not by a change of pH but by combining azo dye anions with polyvalent cations having the tendency to form lakes or difficultly soluble aggregates with said azo dye anions, said lakes or aggregates being colored differently from the normal alkali salts of said azo dye anions. The color prevailing during exposure, is shifted by removing said polyvalent cations, and cannot be restored in the absence of said cations.

Carroll's process is not believed to depend on the use of pH sensitive dyes, it apparently being only necessary for Carroll's purpose that his dyes form essentially insoluble derivatives with certain salts and that the cations be subsequently removable. In the instant invention, however, color change of the dye to its transmittant form takes place simply by shifting the pH either to a lower or higher value than that at which the dye exists in its absorbent form, and after exposure reconverting the dye to its absorbent form merely by adjusting the pH.

Further, Carroll's dyes are ortho hydroxy azo dyes in contrast to the dyes of this invention as described more fully hereinafter, and Carroll's dyes are highly stable to pH changes. Thus, such dyes only change in color by treatment with concentrated acids or alkalies, and are accordingly unsuitable in our process and incompatible with conditions existing in the manufacture of photographic emulsions or conditions obtaining in photographic processing operations.

However, in the present invention, the azo dyes are preferably those having an electropositive substituent, e.g., hydroxy, in the 4 position of the aromatic radical with respect to the azo group. With such dyes large color shifts can be produced by relatively small changes in pH, using solutions having a pH rendering them compatible with conditions existing during the coating of the photographic emulsions on the photographic support or film, and also with conditions encountered in the photographic processing operations. Since the invention dyes produce large color changes with small pH changes, the invention employing such dyes is not detrimental to coating, storage or processing of photographic emulsions or layers.

U.S. 2,231,685 discloses a multilayer photographic material, the red sensitive layer of which is purportedly dyed magenta and later purportedly transformed to blue-green. According to the patent the magenta dye may be converted to blue by using a dye which is transparent to red light and which may be converted to a blue-green by means of a dilute solution of an organic base, setting forth Niagara Blue G as an example of such a dye, and pyridine as an example of such an organic base. The above indicated color conversion is not believed achieved through the use of a pH sensitive dye, and it is significant that the patentee defines this conversion of the dye Niagara Blue G in pyridine not as a change of color but as an improvement of color.

In the Obergassner British Patents 1,549 of 1912 and 182,167, a filter screen containing dyes is sensitized with potassium bichromate, and the bichromate sensitized screen is then exposed through a developed silver layer. After dissolving out the soluble parts of the screen with water, the dyes in the screen are then converted by treatment with acid or alkali to their complementary colors. The process of Obergassner is an additive process and not a subtractive process, as is the herein described silver dye bleach process, and it is not possible to differentially sensitize Obergassner's bichromate layers, which is essential for the silver dye bleach process.

Further, in Obergassner, where pH change is made in a medium which doesn't contain any photographic emulsion, i.e., in a multicolor screen, drastic conditions involving the use of strong acids or alkalies are used for conversion of the dyes to their complementary colors. This is contrary to the invention concept in which the color shift must be large enough to be practical, but such color shift must take place within a comparatively small pH range compatible with the sensitive photographic emulsions in which our dyes are incorporated.

Hanson, 2,449,966, incorporates in a sensitive emulsion layer a colored coupler colored so that it absorbs light of the same color as the undesired absorption of the dye formed from it prior to coupling and acts as a mask, but upon coupling is converted to a form which absorbs the color desired for the final dye image.

Hanson's colored couplers are not transformed to image dyes by change in pH, but rather by coupling with the color developing agent used.

Martinez (British), 222,523, discloses the use in color photography of dyes which change color by combining with silver to form silver salts of such dyes.

We furthermore realize that it is known to produce a photographic material having on one side of the support a blue sensitive layer comprising the dye Brilliant Cresyl Blue in its alkaline (yellow) form. This dye is not an azo dye and, therefore, cannot be used in the dyebleach process according to the present invention. Brilliant Cresyl Blue, being an oxazine dye, is a strongly desensitizing agent, the use of which in photographic layers is impractical, and it would be almost impossible to use such a dye in a multilayer material. Furthermore the yellow form of such a dye is the light absorbing form in the layer in which it is used.

Many of the means known to overcome the sensitivity loss in colored light-sensitive layers and described above are of limited applicability, or require a series of additional processing steps. Thus, the above mentioned aggregates of U.S. 2,304,884 (Carroll) are known to exist in a few cases only. No aggregates or lakes of magenta or yellow dyes which transmit the light of desirable wavelength are known. However, all shades, and particularly the three primary colors can be produced according to the present invention. Furthermore, the color of said aggregates is only a little different from the color of the dye itself; e.g., the color of a dye is blue and the color of the corresponding aggregate is purple and still absorbing appreciable portions of red light. However, as will be seen in the following, cyan dyes, according to this invention, can be transformed so that they do not appreciably absorb in the red end of the spectrum. Other advantages of this invention will be seen hereinafter.

The pH-sensitive dyes of our invention can transmit the light of the critical wavelengths at low pH and absorb at high pH or they can transmit at high pH and absorb at low pH. However, if used in multilayer materials comprising a plurality of dyes which transmit during exposure to light and absorb in the finished image, all of these dyes should shift in the same sense, i.e., all of them should transmit at low pH and absorb at high pH or vice versa.

It is to be noted that the meaning of the terms "transmittant" and "absorbing" as used herein must be understood to depend on the case in question; e.g., if a dye existing in a magenta and a yellow form, is used in a green sensitive layer, the magenta form is called "the absorbing form"; whereas the magenta form, if used in a blue sensitive layer, is called "the transmittant form."

The pH which should prevail during exposure to light can be adjusted before the light sensitive material is coated or at any other point before exposure to light. The material can be brought to any pH which is compatible with the light sensitive emulsions, e.g., a silver bromide gelatin emulsion sensitized with a carbocyanine dye may be coated at pH-values ranging from 3.4 to 10.3 or even at pH values beyond these limits. However, we prefer to use azo dyes which do not need too extreme a pH for stabilizing the light-transmitting form, e.g., which shift within the range of from 4.2 to 9.8.

A preferred form of the invention is to use those azo dyes which transmit the light of the critical wavelengths at low pH and absorb at high pH. This group offers the widest variations, comprises dyes of all desirable shades and allows the use of photographic emulsions buffered to low pH preferred according to the more recent findings in the art of emulsion making.

The pH of the final color photographic image can be adjusted after the processing is finished. Sometimes, no special step for adjusting the pH is necessary; in other cases, the material is treated in a bath comprising a buffering agent or in a buffering atmosphere and dried. The pH of the image can be conserved if necessary by applying over the top layer a protective coating which excludes the air hermetically and/or which contains an excess of buffering agent.

Multilayer photographic materials may contain the azo dyes of this invention in all the layers. For example, a material on which objects or images may be reproduced in natural colors may comprise the following layers coated on a transparent or opaque support:

(1) A red sensitive silver halide layer containing the red light transmitting form of a cyan azo dye.

(2) A green sensitive silver halide layer containing the red and green light transmitting form fo a magenta azo dye.

(3) A yellow filter layer.

(4) A blue sensitive silver halide layer containing the red, green and blue light transmitting form of a yellow azo dye.

For making full use of the advantages offered by the pH-sensitive dyes it is advantageous to select those dyes which, while existing in the transmitting form, exercise a filtering action at desired wavelengths, thereby making unnecessary the insertion of separate filter layers and permitting the use of a wider range of sensitizers. E.g., in the above described material layer #1 containing the magenta form of a cyan azo dye may be sensitized with equal advantage with a panchromatic or with a red sensitizing dye, and/or layer #2 may contain a yellow form of a magenta dye permitting then the absence of the filter layer #3.

It will be seen in the following that we found many dyes which fulfill these requirements, i.e., cyan dyes the transmitting form of which is green absorbing, and magenta dyes the transmitting form of which is blue absorbing.

The layers of the above material may be coated in reversed order: E.g., layers #1 and #2 may be reversed if said cyan azo dye transmits red and green light; it is then unnecessary for said magenta dye to transmit red light. If the transmitting form of the cyan dye absorbs blue light, no yellow filter layer is necessary.

It is furthermore possible to produce a material in which only part of the layers (1), (2) and (4) contain dyes as in the above example, whereas the other layers contain dye components or other means to produce color, such as disclosed in U.S. Patents 2,041,827 and 2,071,688.

For example, the material may consist of a red sensitive layer comprising a pH-sensitive cyan dye, of a green sensitive layer comprising a pH-sensitive magenta dye or an azo coupling component from which a magenta dye can be formed and a blue sensitive layer which, after exposure, is dyed by controlled diffusion from a yellow azo dye bath.

Another variation in the use of the dyes of this invention consists in the production of layers which contain the pH-sensitive dyes together with other means to produce color.

Of particular importance is the combination of the pH-sensitive dyes of this invention with ordinary azo dyes. E.g., the above four-layer material, containing in layers (1), (2) and (4) only 60 to 90% of the pH-sensitive dyes required to give the necessary optical density in the finished image, and containing complementary quantities (40 to 10%) of ordinary azo dyes, has advantages which neither a material containing exclusively ordinary azo dyes nor a material containing exclusively pH-sensitive dyes possesses. Whereas the coloring exclusively with dyes absorbing in the range of maximum sensitivity produces a material which has low speed it has the advantage to produce, by the filtering action of the dyes, a material which has great latitude of exposure and therefore reproduces details in the highlights as well as in the shadow areas of the image. A material containing in each of the layers (1), (2) and (4), 60 to 90% of the dye in the transmitting form and 40 to 10% of the dye in the absorbing form, has a sufficiently great latitude of exposure and a sufficiently high speed. This mixture of pH-sensitive and ordinary dyes can be replaced with those pH-sensitive dyes with change in intensity rather than in shade or which shift the color only little, e.g., from cyan to blue or from magenta to violet.

In all these examples, the pH-sensitive dyes are distributed homogeneously within the single layers of a multilayer material; instead they may form distinct particles within a layer. E.g., a silver halide gelatin emulsion layer comprising dyed resinous particles or a layer comprising dyed silver halide emulsion particles can be processed according to the present invention. Adjacent particles within the same layer may be dyed identically or differently.

It is the particular advantage of our invention that it facilitates the selection of suitable azo dyes for multilayer materials. It was found that it is difficult to produce in a photographic material three azo dyes, e.g., yellow, magenta and cyan, according to only one of the methods hitherto known; e.g., it is difficult to find a combination of three diazo compounds which will react with only one azo coupling component to produce three dyes of the required shades; the use of azo dyes according to this invention in at least one layer makes the selection of azo dyes or potential azo dyes, such as coupling components, in the remaining layers comparatively easy.

Further, it was not evident from the prior art that even by shifting the dyes to a pH at which the dyes are absorbent to light waves for which the layers containing such dyes were sensitive during exposure, three azo dyes for the three light sensitive layers could be found, all of which dyes shift in the same direction of the spectrum. The invention solves this difficulty by providing a photographic material containing dyes having the above characteristics, and also provides procedure for accomplishing the desired pH shifts under mild conditions compatible with the photographic material and the processing thereof.

It is a further advantage of the invention that a material comprising the pH-sensitive dyes according to our invention requires no additional processing steps, but only the processing steps ordinarily required in the dye bleaching process.

Materials, comprising pH-sensitive dyes, are suitable for a number of other novel applications as will be apparent from the following description relating to the production of color cinematographic sound films.

The materials and process of the present invention are admirably suited for the production of cinematographic sound films wherein the picture is a color picture and wherein the sound record in the sound track is a metallic silver image, as the pH sensitive dyes in the sound track portion of the film can be in their transmittant form while such dyes can be in their absorbent form in the picture portion of the film. For example, when a film in accordance with the invention is employed, a protective coating such as, for example, wax or lacquer, is applied over the sound track portion of the film containing the silver image while the pH sensitive dyes in such portion are in the transmittant form and the dyes of the picture area are then converted into the absorbent form, or a protective coating can be applied over the picture area while the dyes are in absorbent form and the sound track can then be buffered to convert the dyes therein to the transmittant form. The same effect can be achieved without the use of protective coating by buffering the picture and sound areas to a different pH by the local application of thickened buffering agents. It is possible thereby to reproduce sound free of distortions without diffused bleaching of the azo dye in any of the layers of the sound area, and to use photocells which are sensitive for visible, particularly red light.

A great many of the azo dyes to be used according to our invention absorb at the critical wavelengths in the transmitting form less than 5% of what they absorb in the absorbing form. While existing in the transmitting form they do not have detrimental effects on the sensitivity of the photographic emulsion. While existing in the absorbing form, many of our new dyes are very brilliant and fast to light.

Some of them diffuse in photographic colloids and can be rendered non-diffusing by suitable precipitating agents; e.g., diffusing acid dyes can be used in combination with the bases disclosed in U.S. Patent 2,368,647. Other dyes having high molecular weight or having substituents which increase their substantivity or being insoluble do not diffuse in photographic colloids. Such dyes may be obtained by methods disclosed in U.S. Patents 2,356,759 and 2,470,769.

It is known that the transition point of most pH indicating dyes depends on accessory factors such as the solvent; e.g., a benzene solution of a dye may change color at a pH which is different from the pH at which an aqueous solution of the same dye changes color. It is surprising, however, that even in an established binding agent such as gelatin, the observed shift from the transmitting to the absorbing form may take place at a somewhat different pH, dependent on whether the gelatin is wet or dry, hardened or not with formaldehyde, whether and how much spreading agent it contains, and so on. If the dyed gelatin contains organic solvents such as alcohols, ketones, esters, ethers, ureas, amines etc., the color of the dye changes in a processing bath of lower pH than if these solvents are not present. Suitable solvents are, for example, polyethylene glycols, partially esterified or etherified cellulose, sodium dodecylsulfonate, dibutylketone and cholesterin. Finally, substances such as polyethyleneimines, anhydroaminobenzyl alcohol, formaldehyde urea resins and quaternary amine bases can be used which act simultaneously as buffers and as means to shift the transition point of the dye by solvent action.

The following examples will illustrate our invention further:

EXAMPLE 1

A quantity of 2.25 grams of the dye obtained by coupling diazotized 4-nitraniline-2-sulfonic acid with 1-p-toluenesulfamino-5-naphthol is incorporated into 1 liter of a photographic silver halide emulsion for the purpose of producing an image forming layer, and into 1 liter of a 7% gelatin solution for the purpose of producing a filter layer. The dyed emulsion and the dyed gelatin are brought to pH 6.0; e.g., by addition of citric acid, coated on glass plates and dried. The color of the plates is magenta. The optical density of the filter plate in transmitted light (or of the emulsion plate after fixing, buffering to pH 6 and drying) is seen from the table below. After bathing in a 4% sodium carbonate bath, washing with tap water and drying, the filter plate becomes cyan. The optical density of this plate (or of the emulsion plate after exposure, development, dye-bleaching, removing of the silver, buffering in a sodium carbonate bath and drying, and measured at the places where no metallic silver was formed during development) is seen in the last column of the table:

*Table 1*

| Wavelength | pH 6 | After carbonate treatment |
|---|---|---|
| 520 | 1.87 | 0.68 |
| 540 | 2.25 | 0.79 |
| 560 | 2.50 | 0.99 |
| 580 | 1.38 | 1.23 |
| 600 | 0.48 | 1.58 |
| 620 | 0.24 | 2.25 |
| 640 | 0.24 | 2.13 |
| 660 | 0.20 | 3.0 |

If in the foregoing example the coupling component is replaced with 1-benzoylamino-5-naphthol, the shift from red to cyan takes place at higher pH. However, if the 4-nitraniline-2-sulfonic acid is replaced with 4-nitro-1-naphthylamine-6-sulfonic acid, a brilliant cyan dye forms at a lower pH. Thus, if a gelatin coating containing the dye 4-nitro-1-naphthylamine-6-sulfonic acid→1-p-toluenesulfamino-5-naphtol is brought to pH 5.6 and coated, and the coating is treated in a sodium bicarbonate bath, analogous results are obtained.

By replacing the 4-nitro-1-naphthylamine-6-sulfonic acid with the corresponding 5 or 7-sulfonic acid or with other suitable diazotizable or tetrazotizable components such as 2-amido-6-ethoxybenzthiazole and 4,4'-diaminoazobenzene, and by replacing the N-p-toluenesulfo-1,5-aminonaphtol with analogous compounds such as disclosed in co-pending U.S. application S.N.75,487, filed on February 9, 1949, now Patent No. 2,688,542, or with compounds of the type 1-alkylamino-2-alkyl-5-naphtol, similar dyes are obtained.

The following table shows the optical densities of a dry gelatin layer comprising the dye,

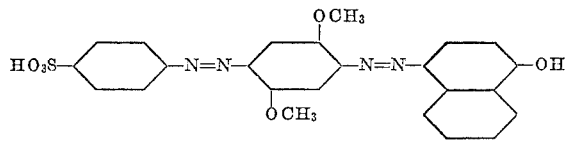

coated at pH 5. The last column shows the densities of the same layer, bathed for 5 minutes in a 0.1 normal sodium carbonate solution, washed for 4 minutes in water and dried.

*Table 2*

| Wavelength | pH=5.0 | After carbonate treatment |
|---|---|---|
| 480 | 1.17 | .55 |
| 500 | 1.47 | .63 |
| 20 | 1.67 | .72 |
| 40 | 1.82 | .83 |
| 60 | 1.47 | 1.02 |
| 80 | 1.07 | 1.17 |
| 600 | .56 | 1.42 |
| 20 | .27 | 1.72 |
| 40 | .10 | 2.70 |
| 60 | .02 | over 4 |
| 80 | .01 | over 4 |

The above dye was prepared by coupling diazotized sulfanilic acid with 2,5-dimethoxyaniline, by diazotizing the monoazo dye thus obtained and coupling it in acid solution with 1-naphthol.

In the presence of organic solvents such as alcohols and ketones, particularly non-volatile solvents such as polyethyleneglycols, the color shift of most of these dyes takes at a lower pH in the absence of said solvents. Therefore, a dye which, in chrome alum hardened gelatin requires a carbonate buffering in the final processing bath, may be treated in a bath containing sodium bicarbonate and diethylene glycol; a bicarbonate bath can be replaced with a sodium acetate diethylene glycol bath, etc. Other suitable buffering baths comprise primary, secondary, tertiary sodium phosphate and mixtures thereof, sodium borate, ammonia, ammonium carbonate, triethanolamine, diethylamine, potassium hydroxide and so on.

It is obvious that a layer, immersed in a potassium hydroxide bath can be buffered to a higher pH than a layer immersed in a bath containing a phosphate mixture. But the final result depends on the concentration and the duration of the bath and on the thickness of the layer and if a rinse is applied, on the duration of the rinse. We prefer buffering agents such as ethanolamine which do not tend to separate from the dried layer in a heterogeneous phase, even when present in large excess; and we furthermore prefer buffering agents which, even in excess, do not cause the pH of the layer to be more extreme than is necessary.

EXAMPLE 2

A dye obtained by coupling in acid solution diazotized 2,5-dichlorosulfanilic acid with 1-naphthol is incorporated into a silver halide emulsion containing 7% of gelatin and 0.7% of a polyethylene glycol (manufactured and sold by the Carbide & Carbon Corp. under the name "Carbowax 4000"). The following table shows the transmission densities of thin coatings, made with the dyed emulsion, freed from silver in a hypo bath and brought to different pH.

*Table 3*

| Wavelength | pH 9.2 | pH 6.6 |
|---|---|---|
| 440 | .32 | .68 |
| 460 | .38 | .64 |
| 480 | .42 | .49 |
| 500 | .52 | .34 |
| 520 | .71 | .22 |
| 540 | 1.00 | .13 |
| 560 | 1.00 | .11 |
| 580 | .85 | .08 |
| 600 | .55 | .02 |
| 620 | .10 | .02 |

The above emulsion was sensitized with a green sensitizer; one part of the emulsion was buffered to pH 6.6 and another part was buffered to pH 9.2; both these emulsions were coated, dried, exposed to green light behind a gray scale and developed in the same manner. (For this comparison, the coatings must be buffered to the same pH before development, because otherwise the developer acts more rapidly in the coating buffered to pH 9.2 than in the more acidic coating.)

It was found that the coating at pH 6.6 had nearly the same speed which had a control coating with the sensitized non-dyed emulsion, whereas the coating at pH 9.2 lost so much speed as to render this coating worthless for use as a taking material in a camera.

Many other dyes obtained by coupling diazo components with 1-naphthols in the 4-position were found to be valuable. Particularly the 2-substituted derivatives of 1-naphthol such as 2-alkyl-1-naphthols, 2-acyl-1-naphthols, 1-hydroxy-2-naphthamides and particularly Mannich type condensation products of 1-naphthol, formaldehyde and secondary amines, were suitable components in the production of these dyes. They shift color within a practical pH range, comprise a wide range of shades and have desirable photographic properties.

EXAMPLE 3

A polymeric yellow dye of a type disclosed in U.S. Patent 2,356,759 which possibly has the following structure:

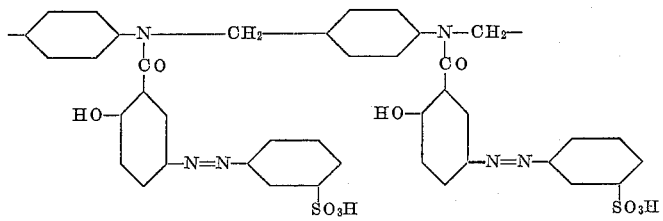

is obtained by melting anhydroaminobenzylalcohol with salol and by coupling the intermediate product thus obtained with diazotized metanilic acid. The high molecular weight fractions of this dye, separated as disclosed in co-pending application S.N. 58,619, filed November 5, 1948, now Patent No. 2,644,753, do not diffuse in gelatin.

The dye is dissolved in water, added to a photographic silver halide emulsion which then is buffered to pH 5.2 and coated to form a layer of a multilayer material. The following table shows the optical densities of a dry gelatin-layer containing the dye of this example at different wavelengths and at two different pH values:

*Table 4*

| Wavelength | pH 5.2 | pH 7.0 |
|---|---|---|
| 340 | 2.03 | 1.47 |
| 360 | 2.00 | 1.67 |
| 380 | 1.47 | 1.69 |
| 400 | 0.67 | 1.90 |
| 420 | 0.39 | 2.00 |
| 440 | 0.32 | 1.80 |
| 460 | 0.25 | 1.49 |
| 480 | 0.16 | 0.92 |
| 500 | 0.08 | 0.40 |

Many other yellow dyes, particularly salicylic acid type dyes among which we found salicylic amide dyes most suitable, are weakly colored in acid media. This is more or less the case in all dyes obtained by coupling phenols in p-position; e.g., in the dyes obtained from o-cresotinic acid and from derivatives thereof. The weakly colored (transmittant) form of these dyes sometimes has a filtering action in the ultraviolet part of the spectrum which action may have a beneficial effect in multilayer materials. Suitable dyes of this class are, e.g., the dye obtained by coupling sulfanilic acid with N,N',N''-trisalicylylmelamine, and the dye obtained by coupling metanilic acid with N,N'-di-(o-cresotinyl)-benzidine-2,2'-disulfonic acid.

Thus, as noted in Table 4, at a wavelength of 420 mu., corresponding to maximum optical density when the pH sensitive dye is in its absorbent form at pH 7.0, the ratio of the optical density of the transmittent form (0.39) to the absorbent form (2.00) of said dye with respect to light waves to which the emulsion is sensitive is about 1:5. In the case of the dye having the optical densities given in Table 3, this ratio (taken at a wavelength of about 560 mu., the maximum density when the dye is in absorbent form) is about 1 to 9. This ratio is even smaller for the dyes whose transmission and absorption densities are set forth in Tables 1 and 2. The ratio of the optical density of the transmittent form to the absorbent form of the pH sensitive azo dyes of the invention, with respect to light waves for which the layers containing these dyes are respectively sensitive, is preferably not greater than 1:5, and most desirably not greater than 1:9.

EXAMPLE 4

A photographic material to produce images in natural colors is made by coating on a transparent or opaque support in successive order layers of the following composition:

(1) A red sensitive silver bromide emulsion of medium high speed containing the dye

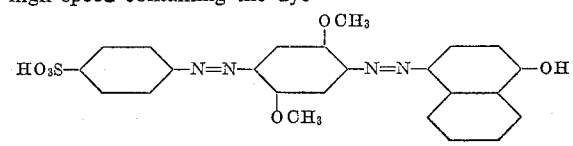

or any of the dyes listed in Example 1.

(2) A green sensitive silver bromide emulsion of medium high speed containing the dye obtained by coupling in acid solution 4-acetylamino-1-naphthylamine-6-sulfonic acid with 1-naphthol or a dye selected from those of Example 2.

(3) A yellow filter layer such as disclosed in U.S. Patent 2,274,782.

(4) A blue sensitive silver bromide or silver chlorobromide emulsion of medium high speed containing the dye obtained by coupling metanilic acid with salicyloyl-anhydroaminobenzylalcohol.

Each emulsion is buffered, before coating, to pH 5, or the completely coated material is treated in a tartaric acid buffer bath and dried.

The quantities of compounds employed for each layer are, e.g., 10 grams silver halide, 8 gr. gelatin, 5 mg. sensitizing dye and 0.5 to 1.0 gr. of pH-sensitive dye per square meter. The quantities of pH-sensitive dyes are selected as to produce densities of about 3.0 in transmitted light at the wavelengths 460, 540 and 620 mu. in the material treated in a fixing bath, brought to pH 8.0 and dried.

When the photographic material is used for color prints on an opaque support the dye quantities are lower.

This material, possessing a medium high speed is exposed in a camera or through a multi-color transparency, developed, fixed, treated in a dyebleach bath such as described in U.S. Patent Re. 22,308, in an acid copper chloride bath and again in a fixing bath. It is thoroughly washed, buffered by bathing in a sodium carbonate or another alkaline bath, rinsed to remove the excess of buffering agent and dried. An image in natural colors is obtained.

EXAMPLE 5

The material of the foregoing example is modified by replacing the dye in the red sensitive layer with naphthalene-1,5-di-(1-sulfamino-5-naphthol) or with another cyan azo coupling component such as described in copending application S.N. 75,487, filed on February 9, 1949, now U.S. Patent No. 2,688,542. The material is treated in the same manner as above, but before the dye-bleach bath there is inserted a bath containing 1% acetic acid and 0.1% 4-nitro-1-diazonaphthalene-6-sulfonic acid or another suitable diazo bath such as disclosed in the aforesaid application. The same result is obtained.

EXAMPLE 6

A two-color printing material is made in the following way:

A red sensitive silver halide emulsion comprisng a cyan pH-sensitive dye is coated on a support. Suitable dyes are obtained by coupling in acid solution tetrazotized 4,4'-diaminoazobenzene with 2 mols of 1-naphthol or by coupling diazotized 4-amino-2,5-dimethoxyazobenzene-4'-sulfonic acid with 1-toluenesulfamino-5-naphthol.

A blue absorbing layer, e.g., a layer comprising a yellow filter dye is laid thereupon.

An unsensitized silver halide emulsion comprising the dye of Example 3 above and a smaller quantity of a magenta dye (not necessarily pH sensitive) is coated on top. A suitable magenta dye is obtained by coupling tetrazotized 4,4'-diaminodiphenyl ether with adipyl-H-acid.

All layers are brought to pH 5.2.

The material is exposed under two separation positives as obtained with the aid of a bipack customary in color motion picture making. Then it is processed in a manner described in Example 4 above. A "two color" image is obtained.

EXAMPLE 7

A material which has great latitude of exposure is made by coating on an opaque support in successive order:

(1) A red sensitive silver bromide emulsion, buffered to pH 5 and containing a quantity of the dye 4-nitraniline-2-sulfonic acid→1-(naphthalene-2-sulfamino)-5-naphthol to give a maximum transmission density of 0.7 at 630 mu in the finished image, and a quantity of the trisazo dye aniline-2,5-disulfonic acid→1-naphthylamine→2-ethoxy-1-naphthylamine-6-sulfonic acid→phenyl-J-acid to give a maximum transmission density of 0.4 at 630 mu in the fixed-out material. The dye quantities by weight necessary to produce said densities vary, depending on the quantities of inorganic salts or moisture which are present in most dye preparations, and should be established for each batch of dye.

(2) A green sensitive silver bromide emulsion of pH 5 containing a quantity of the dye 4-nitraniline-2-sulfonic acid→N,N-(di-n-butyl)-m-phenetidine to produce a maximum transmission density of 0.9 at 540 mu in the finished image and a quantity of the dye

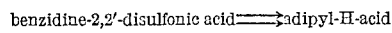
benzidine-2,2'-disulfonic acid⇌adipyl-H-acid to produce a maximum density of 0.3 at 540 mu in the fixed-out material.

(3) An unsensitized silver chloro-bromide emulsion buffered to pH 5, containing the dye metanilic acid→N,N'-trisalicylylmelamine in such a quantity as to produce a maximum transmission density of 1.2 at 460 mu in the finished image.

If the above layers are coated on a transparent support, the reported density figures for all the dyes should be approximately 2.5 to 3 times higher.

The material is exposed and processed in the manner described in Example 4 above. An image in natural colors is obtained.

EXAMPLE 8

A red sensitive silver halide gelatin emulsion dyed with the dye obtained by coupling 2 mols of diazotized 4-nitraniline-2-sulfonic acid with 1 mol of 2,6-di-(piperidinomethyl)-1,5-dihydroxynaphthalene is hardened to such a degree as to render the gelatin insoluble in water of 40° C.

A green sensitive silver halide gelatin emulsion dyed with the dye obtained by coupling tetrazotized 4,4'-diaminostilbene-2,2'-disulfonic acid with two mols of 2-decanoyl-1-naphthol, is hardened in the same manner.

Both these emulsions are finely dispersed and suspended in a gelatin carrier which is brought to pH 5.2 and coated onto a support. The dye and silver quantities employed are the same as in Example 4 above.

On top of this coating there is applied a layer consisting of a blue sensitive silver halide emulsion containing the m-sulfobenzoic acid ester of the dye obtained by coupilng diazotized 2-naphthylamine-6,8-disulfonic acid with p-cresol.

The dye contained in the red-sensitive emulsion grains is yellow and will be cyan at higher pH; the dye contained in the green-sensitive emulsion grains is yellow and will be magenta at higher pH; the ester contained in the top layer is very weakly yellow and will hydrolize in a photographic developer, alkaline by sodium carbonate, to form the yellow dye 2-naphthylamine-6,8-disulfonic acid→p-cresol, which is about four times as intensely colored as the ester.

The material is exposed, developed, dyebleached, freed from silver and buffered to pH 8 in the same manner as the material of Example 4. An image in natural colors is obtained.

EXAMPLE 9

A red-sensitive silver halide emulsion is dyed with the dye obtained by coupling one mol of tetrazotized 4,4'-diaminoazobenzene with one mol of naphthalene-1,5-di-(1-sulfamino-5-naphthol). This latter component is prepared by N-acylating 2 mols of 1,5-aminonaphthol with 1 mol of naphthalene-1,5-disulfochloride. The emulsion is brought to pH 5.2 and coated to form a layer on a support.

Thereupon a green sensitive silver halide emulsion layer is coated which comprises 1-(m-aminobenzenesulfo-m-aminobenzoyl-m-aminobenzenesulfamino) - 8 - naphthol-3,6-disulfonic acid.

On top of this layer, a gelatin layer comprising colloidal silver is coated, and finally a blue sensitive silver halide emulsion layer.

After exposing to light, developing and fixing, the amine incorporated into the originally green sensitive layer is converted into a magenta dye by the method disclosed and claimed in U.S. Patent 2,368,463. Then the material is bathed in an aqueous solution of the yellow dye Chrysophenine G (Schultz, Farbstofftabellen, 7th edition, volume 1, #726), allowing for the dyeing of the top layer only.

Thereafter, the material is treated in dyebleach, ferricyanide and thiosulfate baths, and finally in a sodium tertiary phosphate buffer bath. An image in natural colors is obtained.

EXAMPLE 10

A support was coated with the following successive layers:

(1) A red sensitive silver halide gelatin emulsion dyed with the dye obtained by coupling 2 mols of diazotized 4-nitraniline-2-sulfonic acid with 1 mol naphthalene-1,5-di-(1-sulfamino-5-naphthol).

(2) A green sensitive silver bromide emulsion of medium high speed, containing the dye obtained by coupling tetrazotized benzidinesulfonedisulfonic acid with N-(3'-carboxy - sulphonyl-phenyl)-2-ethoxy-1 - aminonaphthalene.

The above dye at a pH lower than 5.5 gives a clear yellow color.

(3) On top of this a blue sensitive silver bromide or silver chloride emulsion of medium high speed, containing the dye obtained by coupling metanilic acid with salicyloyl-anhydroaminobenzylalcohol.

Each emulsion is buffered before coating to pH 5, or the completely coated material is treated in a tartaric acid buffer bath and dried.

The quantities of compounds employed for each layer are: 10 grams silver halide, 8 gr. gelatin, 5 mg. sensitizing dye and 0.5 to 1.0 gr. of pH-sensitive dye per square meter. The quantities of pH-sensitive dyes are selected so as to produce densities of about 3.0 in transmitted light at the wavelengths 460, 540 and 620 mu in the material treated in a fixing bath brought to pH 8.0 and dried.

When the photographic material is used for color prints on an opaque support the quantities of dyes employed are generally lower.

EXAMPLE 11

A photographic support is coated with the following successive layers:

(1) A high speed silver bromoiodide emulsion containing the yellow azo dye described in Example 4, paragraph 4, or containing the yellow dye obtained by coupling a diazo compound with salicyloyl amide or its substitution products such as ortho cresotinic acid amides as described in Example 3. The emulsion is brought to a pH of 5.2.

Instead of the bromoiodide emulsion, chloride or chlorobromide emulsion can be used if it is sensitized to the long wave part of the blue spectrum. For instance, as a sensitizer, benzothiocyanine or a merocyanine dye such as 3-ethyl-benzothiazolydene-hexyl-rhodanine can be used.

(2) On top of this material an emulsion containing a green sensitized silver chloride or silver chlorobromide emulsion of bromide content of less than 20 mol-percent is coated, which is colored with a magenta dye obtained by coupling tetrazotized di-aminodiphenyl-ether with N,N'-adipyl-bis-(1-amino-8 - hydroxy naphthalene-3,6-disulfonic acid), or containing a magenta dye as described in Example 7 of U.S. Patent 2,644,753.

(3) On top of this material a red sensitive silver chloride or silver chlorobromide emulsion containing less than 20 mol-percent silver bromide is coated, which contains a cyan azo dye such as described in Example 9 of U.S. Patent Re. 23,375, or a cyan azo dye as described in Example 3 of U.S. Patent 2,612,496.

The dye contained in the bottom layer is very weakly yellow at a low pH and when buffered to a pH higher than 6 it will form a yellow dye of high tinctorial power. The quantity of the dye is such that its dye density in the neutral or alkaline state will produce a maximum density 3 at 460 in the finished image.

The magenta and cyan layers contain dyes which are not pH sensitive. However this combination will produce a color photographic material of a high transmission in the long wave blue part of the spectrum when the bottom layer containing the yellow dye is buffered to a pH lower than 5.5, that is, when it is contained in its transmittant state.

The green sensitive magenta colored emulsion can also be coated as the top layer, thus reversing the sequence of the cyan and magenta layers, or alternately, the yellow sensitive layer can be used as the top layer.

The material is printed with the aid of a yellow filter which absorbs short wave blue light such as a Wratten #3 or #4 filter. The combination described in this example is especially valuable for transparency duplicating material because it permits the use of magenta dyes which have a comparatively low transmission in the long wave blue part of the spectrum. The dye density and silver halide content are similar to that in Example 10. The processing of the material is done in the same way as described in the previous examples.

Many more dyes than those mentioned in the examples are suitable for our process. However, the known indicator dyes usually do not meet the requirements of spectral absorption necessary in color photography whereas the dyes listed in this specification represent examples of groups particularly suitable for color photographic use.

It was quite unexpected from the study of the known indicator azo dyes that a complete set of dyes, comprising all shades and particularly yellow, magenta and cyan shades could be made which have the spectral absorption desirable for color photographic purposes, which have transition points within the practical pH-range and which are compatible with photographic emulsions and processes.

The preferred azo dyes, used in our process, adhere to the general formula X—A—N=N—B—Y where A stands for an aromatic radical; where X stands for an electropositive group such as a hydroxyl group or an amino group or an alkylated or arylated amino group or an amino group which is acylated with an organic sulfonic acid; where B stands for an aromatic radical, and where Y stands for a substituent, preferably an electronegative group such as a nitro, sulfo, sulfone, sulfamide, carboxylic acid, carboxylic ester, carboxylamide, keto, nitrile, vinyl or azo group, or where B and Y together stand for the residue of an azo coupling component comprising a reactive methylene group. The term "electropositive group" or "electropositive substituent" is intended to denote an electron releasing group, and the term "electronegative group" or "electronegative substituent" is intended to denote an electron attracting group.

We found that the azo dyes carrying the substituent X in 4-position with respect to the azo group are generally more valuable than the isomeric 2-substituted dyes. The 4-substituted dyes, incorporated in gelatin, change their color sharply from one stable form to another stable form, whereas many other azo dyes are not pH sensitive or change the color gradually over a wider pH range, thereby rendering difficult the stabilization of a pure transmitting and a pure absorbing form. Another important characteristic of these 4-substituted azo dyes is that the shift from the transmitting to the absorbing form is quite large; e.g., a shift from yellow to magenta or magenta to cyan, whereas many of the 2-substituted dyes show a less pronounced shift, e.g., from yellow to orange, or from magenta to purple.

The presence of an electronegative group Y increases the polarity of the azo group

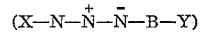

$$(X-N-\overset{+}{N}-\overset{-}{N}-B-Y)$$

particularly if said group Y is in 4-position with respect to the azo group. However, the electronegative group Y may stand in the less efficient 2-position or in the still less efficient 3-position. An electronegative group in 2-position enhances the efficiency of a similar group in 4-position. Therefore, an electronegative group, such as a carboxylic acid group, in 4-position, has about the same effect as two weaker electronegative groups, such as chloro, in 2 and 4-positions. In dyes which are yellow at high pH, only little polarity is needed, and therefore the group Y may be absent or Y may be a substituent in any position with regard to the azo group. In dyes which are magenta at high pH we prefer an electronegative group Y to be in 2- or 4-position, and in dyes which are cyan at high pH we prefer a particularly efficient substituent Y, such as a nitro or an azo group, in 4-position with respect to the azo group shown in the above formula.

Azo dyes, containing suitable radicals XA–, are prepared by coupling diazo compounds with compounds XAH or by coupling diazo compounds XAU, where U stands for a diazo group, with azo coupling components.

Suitable compounds XAH are phenol, 1-naphthol, 1-acetylamino - 5 - naphthol, 1 - naphthylamine, 1 - diethylamino-3-ethoxybenzene, 1-diethylamino - 3 - acetylaminobenzene, 1-naphthylamine-6-sulfonic acid, diphenylamine, 1-p-toluenesulfaminonaphthalene-6-sulfonic acid, etc. In this class of compounds we prefer those which carry on the residue A, in ortho position with respect to the substituent X, a substituent such as in salicylanilide, o-cresotinic acid, 1-hydroxy-2-naphthoic acid, 2-dodecyl-1-naphthol, 2-dimethylaminomethyl-1-naphthol, 2-aceto-1-naphthol, and 1,2,3,4-tetrahydro-7,8-benzoquinoline-3,7-diol.

Suitable compounds XAU from which the azo dyes of our invention can be prepared, are obtained by diazotization of such compounds as 4-diethylaminoaniline, 4-diethylamino-2,5-diethoxyaniline, 4-aminodiphenylamine, 2-amino-5-diethylamino diphenyl sulfone. These compounds may be replaced by such compounds as diazotized p-nitraniline which is reduced after coupling or by diazotized 4-acetylaminoaniline which is hydrolized after coupling.

These diazo compounds are coupled with compounds YBH such as pyrazolones, aromatic amines or acylaminonaphtholsulfonic acids.

Many of the preferred azo dyes where Y stands for an electronegative residue in 4-position are formed by coupling an azo coupling component XAH with a diazo compound YBU obtained by diazotization of a compound YBNH$_2$. The dyes where Y stands for a nitro group are formed, e.g., from 4-nitraniline, 4-nitro-1-naphthylamine-7-sulfonic acid, 2-amino-5-nitrodiphenylsulfone or 2-amino-5-nitrobenzenesulfanilide; those where Y stands for a sulfo group are formed, e.g., from sulfanilic acid or from 2-nitraniline-4-sulfonic acid; those where Y stands for a sulfone group are formed, e.g., from tetrazotized 4,4'-diaminodiphenylsulfone; those where Y stands for a sulfamide group are formed, e.g., from sulfanilamide; those where Y stands for a carboxylic group are formed, e.g., from m-aminobenzoic acid, p-aminobenzoic acid, 4-aminonaphthalene-1,8-dicarboxylic acid, methyl anthranilate or from Diazo Light Yellow (Schultz, Farbstofftabellen, 7th edition, volume 1, #749); those where Y stands for a keto group are formed, e.g., from 4-aminobenzophenone-4'-sulfonic acid; those where Y stands for a nitrile group are formed, e.g., from aminobenzonitrile; those where Y stands for a vinyl group are formed, e.g., from tetrazotized 4,4'-diaminostilbene.

Those of the preferred dyes which can be represented by the formula XA—N=N—B—N=N—Z, where —N=NZ stands for Y can be obtained by various methods: Either a dye XA—N=N—BU is coupled with a component ZH, or a dye Z—N=N—BU is coupled with a component XAH, or a 1,4-tetrazo compound BU$_2$ is coupled with two molecules XAH. The residue Z can be identical or not with the residue XA.

The most important class of dyes useful in accordance with the invention have the following constitution

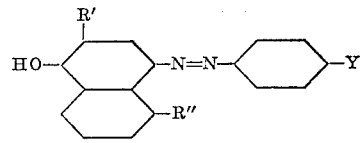

where R' is hydrogen or a monovalent substituent; where R'' is hydrogen, a hydroxyl, an ether or an acylamino group; and where Y is a nitro, sulfo, sulfone, sulfonamide, vinyl or azo group.

Other classes of dyes which are also particularly suitable in accordance with the invention are:

The magenta dyes

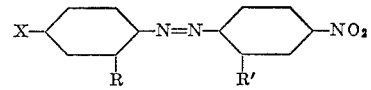

and

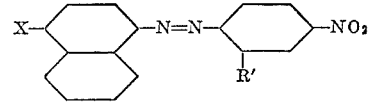

where X stands for a dialkylamino group; where R stands for an ether or an acylamino group; and where R' stands for a hydrogen, sulfo, sulfonamide or sulfone group.

The magenta dyes

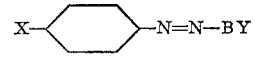

where X stands for a dialkylamino group, and BY for the residue of a pyrazolone.

The yellow dyes

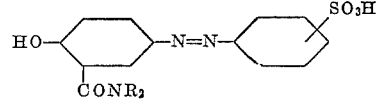

where NR$_2$ stands for an amino group in which R stands for hydrogen or an organic residue.

The dyes shown in the above structural formulae may contain substituents upon the benzene and naphthalene rings in addition to those indicated.

Some of the preferred dyes are described in the foregoing examples; some other typical representatives are listed in the following tables:

| No. | Diazo Compound | Coupled with — | High pH | Low pH |
|---|---|---|---|---|
| 1 | Sulfanilic acid → | 2-ethyl-1-naphthol | magenta | orange. |
| 2 | Sulfanilic acid (2 mols) → | 1,5-dihydroxynaphthalene | ...do | yellow. |
| 3 | 4-Nitraniline-2-sulfonic acid → | 1-diethylamino-3-ethoxybenzene | ...do | Do. |
| 4 | 4-Nitraniline-2-sulfonic acid → | 1-diethylamino-3-acetylaminobenzene | ...do | Do. |
| 5 | 4-Nitraniline-2-sulfonic acid → | 1-dimethylamino-naphthalene | ...do | Do. |
| 6 | 4-Nitraniline-2-sulfonic acid → | 1-toluenesulfamino-naphthalene-7-sulfonic acid | ...do | orange. |
| 7 | 4,4'-diamino stilbene-2,2'-disulfonic acid → | 2-aceto-1-naphthol (2 mols) | ...do | yellow. |
| 8 | 4,4'-diaminodiphenylsulfone → | 1-hydroxy-2-naphthanilide (2 mols) | ...do | orange. |
| 9 | Monoazo dye by coupling 4-diethylaminoaniline → 2,5-diethoxy aniline → | 1,1'-[2,2'-disulfodiphenylene-(4,4')]-bis-[pyrazolone-(5)-3-carboxylic acid]. | ...do | yellow. |
| 10 | 4-Diethylamino-o-toluidine → | .....do | ...do | Do. |
| 11 | 4-Acetylamino-1-naphthylamine-7-sulfonic acid → | 1-naphthol | ...do | orange. |
| 12 | 4,4'diaminoazobenzene → | 1-acetylamino-5-naphthol (2 mols) | cyan | magenta. |
| 13 | Monoazo dye by coupling p-nitraniline → 1-naphthylamine-7-sulfonic acid, followed by reduction of the nitro group → | 1-naphthol (2 mols) | blue | Do. |
| 14 | Monoazo dye by coupling sulfanilic acid → 2,5-dimethoxyaniline → | 1-p-toluenesulfamino-5-naphthol | cyan | Do. |
| 15 | 4-Nitraniline-2-sulfonic acid (2 mols) → | 2,6-di-(piperidinomethyl)-1,5-dihydroxynaphthalene. | ...do | yellow. |
| 16 | p-phenylenediamine | 2-piperidinomethyl-1-naphthol (2 mols) | blue | magenta. |
| 17 | 4,4'-diaminostilbene-2,2'-disulfonic acid → | 1-hydroxy-2-naphthanilide (2 mols) | magenta | blue. |
| 18 | 4-diethylamino-2,5-diethoxyaniline → | N-p-toluenesulfo-N-acid | cyan | magenta. |
| 19 | p-Nitraniline (reduced after coupling) → | 1-naphthylamine-6-sulfonic acid | yellow | Do. |
| 20 | 2,5-Dichlorosulfanilic acid (2 mols) → | N,N'-bis-(2-methylene-1-naphthol)-piperazine | magenta | yellow. |
| 21 | 4-Sulfoanthranilic acid → | 1-hydroxy-2-naphthanilide | yellow | magenta. |
| 22 | 4,4'-diaminoazobenzene → | 1-naphthol (2 mols) | cyan | Do. |

| No. | Diazo Compound | Coupled with — | High pH | Low pH |
|---|---|---|---|---|
| 23 | p-amino-acetophenone ⟶ | 1-naphthol | magenta | yellow. |
| 24 | p-aminobenzoyl-p-aminobenzoic acid (2 mols) ⟶ | 1,5-dihydroxynaphthalene | ___do___ | Do. |
| 25 | p-aminobenzonitrile ⟶ | 2-ethyl-1-naphthol | ___do___ | Do. |
| 26 | 2,4-dichloraniline ⟶ | 1-naphthol | red | Do. |
| 27 | p-aminobenzoic acid ⟶ | ___do___ | ___do___ | Do. |
| 28 | ethyl-p-aminobenzoate ⟶ | ___do___ | magenta | Do. |
| 29 | 4,4′-diaminoazobenzene ⟶ | 5-methoxy-1-naphthol (2 mols) | cyan | magenta. |
| 30 | (2-amino-5-nitrobenzene-sulfo)-diethylamide ⟶ | m-phenetidine-N,N-diacetic acid | magenta | yellow. |
| 31 | (2-amino-5-nitrophenyl)-ethylsulfone ⟶ | 1-diethylamino-3-adipylaminobenzene | ___do___ | Do. |

All these dyes may be monomeric or they may be built according to the principles disclosed in the above mentioned U.S. Patents 2,356,759 and 2,470,769. Such dyes are, e.g., the yellow dye of Example 3, the cyan dye of Example 9, and a dye which is a polymeric analogue to dye #16 of the above table, obtained from equimolecular parts of tetrazotized p-phenylenediamine and N,N′-bis-(2-methylene-1-naphthol) piperazine. The constitution of this latter dye, not taking into account terminal groups which might be present, can be represented by the following formula

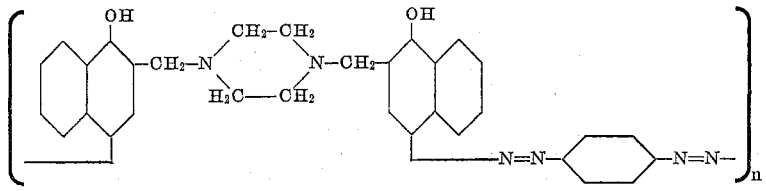

where $n$ stands for a positive integer.

While we have described particular embodiments of our invention for the purpose of illustration, it should be understood that various modifications and adaptations thereof may be made within the spirit of the invention as set forth in the appended claims.

We claim:

1. In the process of producing a photographic dye image from a photographic material having at least two light sensitive silver halide emulsion layers each sensitive for light of one of at least two different predetermined spectral regions, and each of said two layers containing a different pH sensitive azo dye, each of such pH sensitive azo dyes being in transmittant form at the same pH to light waves of the region to which the layer containing such dye is sensitive, and absorbent for such light waves at another pH, each of said dyes being absorbent at the same last mentioned pH, each of said dyes having the formula A—N=N—B wherein A is an aromatic radical carrying an electropositive substituent in position 4 with respect to said azo group, said substituent being a member of the group consisting of hydroxy, amino, arylated amino, alkylated amino and organic sulfonic acid acyl amino groups, and B is an azo coupling component radical selected from the group consisting of aromatic radicals carrying an electronegative substituent of the group consisting of nitro, sulfo, sulfone, sulfamide, carboxylic acid, carboxylic ester, carboxylamide, nitrile, vinyl and azo groups, and a pyrazolone radical, the steps which comprise exposing such photographic material to light while the layers containing the pH sensitive azo dyes are at a pH which is compatible with the light sensitive silver halide emulsion and at which each of such dyes is substantially transmittant to the light waves to which the layer containing such dye is sensitive, forming a dye image in said two emulsion layers from said pH sensitive azo dyes, and at a point after the exposure of such material, adjusting the pH of said emulsion layers in the same direction to a pH at which such dyes are substantially absorbent to the light waves to which said two emulsion layers were sensitive during exposure to cause the dyes in the dye image to be in such absorbent form.

2. In a process of producing a photographic dye image from a photographic material including a support and a coating on said support, said coating containing at least two light sensitive silver halide emulsion layers each sensitive for light of one of at least two different predetermined spectral regions, and each of said two layers containing a different pH sensitive azo dye, each of such pH sensitive azo dyes being in transmittant form at the same pH to light waves of the region to which the layer containing such dye is sensitive, and absorbent for such light waves at another pH, each of said dyes being absorbent at the same last mentioned pH, each of said dyes being a member of the group consisting of dyes having the following formulae:

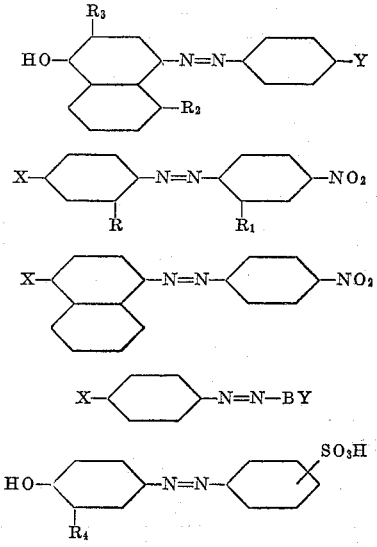

where R is a member of the group consisting of ether and acylamino groups, $R_1$ is a member of the class consisting of hydrogen, sulfo, sulfonamide and sulfone groups, $R_2$ is a member of the group consisting of hydrogen, hydroxyl, ether and acylamino groups, $R_3$ is a member of the group consisting of hydrogen, alkyl, acyl, amido, and alkylamino groups, $R_4$ is an amide group, Y is a member of the group consisting of nitro, sulfo, sulfone, sulfonamide, vinyl and azo groups, X is a dialkylamino group, and BY is a pyrazolone radical, the steps which comprise exposing such photographic material to light while the layers containing the pH sensitive azo dyes are at a pH which is compatible with the light sensitive silver halide emulsion and at which each of such dyes is substantially transmittant to the light waves to which the layer containing such dye is sensitive, forming a dye image in said two emulsion layers from said pH sensitive azo dyes, and at a point after the exposure of such material, adjusting the pH of said emulsion layers in the same direction to a pH at which such dyes are substantially absorbent to the light waves to which said two emulsion layers were sensitive during exposure to cause the dyes in the dye image to be in such absorbent form.

3. A photographic material including a support and a coating on said support, said coating comprising a plurality of superimposed discrete portions, at least two of said portions each containing a light sensitive silver halide and each predominantly sensitive for light of one of at least two different predetermined spectral regions, each of said two portions containing a different pH sensitive azo dye, each of such pH sensitive azo dyes being chiefly in transmittant form with respect to light waves for which the portion containing said dye is sensitive, each of said pH sensitive azo dyes being a member of the group consisting of dyes having the following formulae:

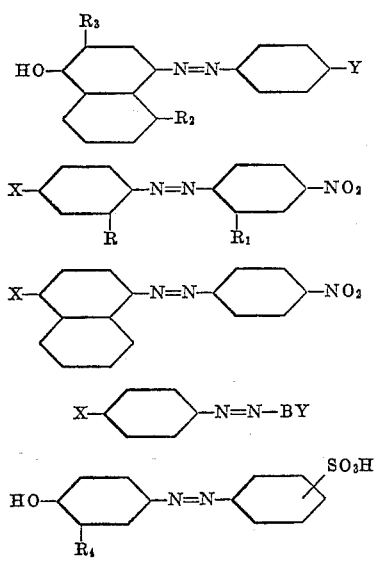

where R is a member of the group consisting of ether and acylamino groups, $R_1$ is a member of the class consisting of hydrogen, sulfo, sulfonamide and sulfone groups, $R_2$ is a member of the group consisting of hydrogen, hydroxyl, ether and acylamino groups, $R_3$ is a member of the group consisting of hydrogen, alkyl, acyl, amido, and alkylamino groups, $R_4$ is an amide group, Y is a member of the group consisting of nitro, sulfo, sulfone, sulfonamide, vinyl and azo groups, X is a dialkylamino group, and BY is a pyrazolone radical, the ratio of the optical density of the transmittant form to the absorbent form of each of said dyes with respect to the light waves for which the portion containing said dye is sensitive being not greater than 1:5, each of said pH sensitive azo dyes being in the aforementioned chiefly transmittant form at the same pH, and in a substantially absorbent form with respect to light waves to which the portion containing such dye is sensitive at another pH, said different pH sensitive azo dyes existing in the absorbent form at the same last mentioned pH.

4. In a process of producing a multicolor photographic image from a photographic material having three superimposed light sensitive silver halide emulsion layers each being predominantly sensitive for light of different predetermined spectral regions and each layer containing a different pH sensitive azo dye, each of such pH sensitive dyes being transmittant at the same pH to light waves of the region to which the layer containing said dye is sensitive and absorbent for such light waves at another pH, each of said dyes being absorbent at the same last mentioned pH, each of said dyes having the formula A—N=N—B wherein A is an aromatic radical carrying an electropositive substituent in position 4 with respect to said azo group, said substituent being a member of the group consisting of hydroxy, amino, arylated amino, alkylated amino and organic sulfonic acid acyl amino groups, and B is an azo coupling component radical selected from the group consisting of aromatic radicals carrying an electronegative substituent of the group consisting of nitro, sulfo, sulfone, sulfamide, carboxylic acid, carboxylic ester, carboxylamide, nitrile, vinyl and azo groups, and a pyrazolone radical, the first layer containing the red light transmitting form of a pH sensitive cyan azo dye as above defined, the second layer containing the red and green light transmitting form of a pH sensitive magenta azo dye as above defined, and the third upper layer containing the red, green and blue light transmitting form of a pH sensitive yellow azo dye as above defined, the steps which comprise exposing said photographic material to light while the layers containing the pH sensitive dyes are at a pH which is compatible with the light sensitive silver halide emulsion and at which such dyes are substantially transmittant to said light waves, forming a dye image in said layers from said pH sensitive azo dyes, and at a point after the exposure of such material, adjusting the pH of said emulsion layers in the same direction to the pH at which such dyes are substantially absorbent to the light waves for which such layers were sensitive during exposure to cause the dyes in the dye image to be in the absorbent form.

5. A photographic material including a support and a coating on said support, said coating comprising a plurality of superimposed discrete portions, at least two of said portions each containing a light sensitive silver halide and each predominantly sensitive for light of one of at least two different predetermined spectral regions, each of said two portions containing a different pH sensitive azo dye, each of such pH sensitive azo dyes being chiefly in transmittant form with respect to light waves for which the portion containing said dye is sensitive, each of said pH sensitive azo dyes having the formula A—N=N—B wherein A is an aromatic radical carrying an electropositive substituent in position 4 with respect to said azo group, said substituent being a member of the group consisting of hydroxy, amino, arylated amino, alkylated amino and organic sulfonic acid acyl amino groups, and B is an azo coupling component radical selected from the group consisting of aromatic radicals carrying an electronegative substituent of the group consisting of nitro, sulfo, sulfone, sulfamide, carboxylic acid, carboxylic ester, carboxylamide, nitrile, vinyl and azo groups, and a pyrazolone radical, each of said pH sensitive azo dyes being in the aforementioned chiefly transmittant form at the same pH, and in a substantially absorbent form with respect to light waves to which the portion containing such dye is sensitive at another pH, said different pH sensitive azo dyes existing in the absorbent form at the same last mentioned pH.

6. A color photographic material including a support having a plurality of superimposed layers thereon, comprising a silver halide emulsion layer sensitive to red light and shielded against blue light and containing a cyan azo dye, a green sensitive silver halide emulsion layer shielded against the blue region of the spectrum and containing a magenta azo dye, and a blue sensitive silver halide layer containing a yellow azo dye, at least two of said dyes being pH sensitive and each of said last mentioned dyes being chiefly in transmittant form with respect to light waves for which the layer containing such dye is sensitive, each of said pH sensitive azo dyes being a member of the group consisting of dyes having the formulae

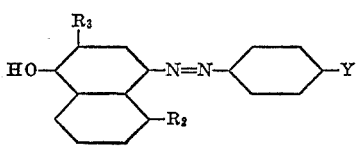

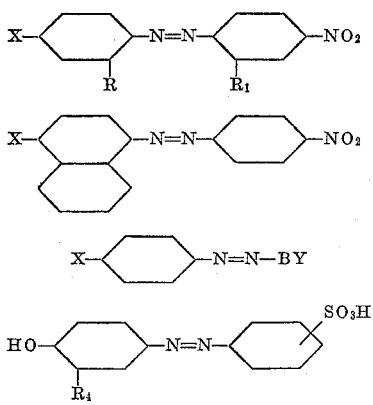

where R is a member of the group consisting of ether and acylamino groups, $R_1$ is a member of the class consisting of hydrogen, sulfo, sulfonamide and sulfone groups, $R_2$ is a member of the group consisting of hydrogen, hydroxyl, ether and acylamino groups, $R_3$ is a member of the group consisting of hydrogen, alkyl, acyl, amido, and alkylamino groups, $R_4$ is an amide group, Y is a member of the group consisting of nitro, sulfo, sulfone, sulfonamide, vinyl and azo groups, X is a dialkylamino group, and BY is a pyrazolone radical, the ratio of the optical density of the transmittant form to the absorbent form of each of said pH sensitive azo dyes with respect to the light waves for which the layer containing said dye is sensitive being not greater than 1:5, each of said pH sensitive azo dyes being in the aforementioned chiefly transmittant form at the same pH, and in a substantially absorbent form with respect to light waves to which the layer containing such dye is sensitive at another pH, said pH sensitive azo dyes existing in the absorbent form at the same last mentioned pH.

7. A photographic material including a support and a coating on said support, said coating comprising a plurality of layers, at least two of said layers each containing a light sensitive silver halide and each predominantly sensitive for light of one of at least two different predetermined spectral regions, each of said two layers containing a different pH sensitive azo dye, each of such pH sensitive azo dyes being chiefly in transmittant form with respect to light waves for which the layer containing said dye is sensitive, each of said pH sensitive azo dyes being a member of the group consisting of dyes having the following formulae:

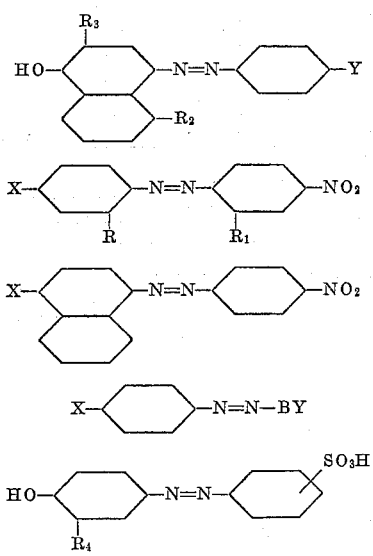

where R is a member of the group consisting of ether and acylamino groups, $R_1$ is a member of the class consisting of hydrogen, sulfo, sulfonamide and sulfone groups, $R_2$ is a member of the group consisting of hydrogen, hydroxyl, ether and acylamino groups, $R_3$ is a member of the group consisting of hydrogen, alkyl, acyl, amido, and alkylamino groups, $R_4$ is an amide group, Y is a member of the group consisting of nitro, sulfo, sulfone, sulfonamide, vinyl and azo groups, X is a dialkylamino group, and BY is a pyrazolone radical, the ratio of the optical density of the transmittant form to the absorbent form of each of said dyes with respect to the light waves for which the layer containing said dye is sensitive being not greater than 1:5, each of said pH sensitive azo dyes being in the aforementioned chiefly transmittant form at the same pH, and in a substantially absorbent form with respect to light waves to which the layer containing such dye is sensitive at another pH, said different pH sensitive azo dyes existing in the absorbent form at the same last mentioned pH.

8. A photographic material including a support and a coating on said support, said coating comprising a plurality of layers, at least two of said layers each containing a light sensitive silver halide and each predominantly sensitive for light of one of at least two different predetermined spectral regions, each of said two layers containing a different pH sensitive azo dye, each of such pH sensitive azo dyes being chiefly in transmittant form with respect to light waves for which the layer containing said dye is sensitive, each of said pH sensitive azo dyes having the formula A—N=N—B wherein A is an aromatic radical carrying an electropositive substituent in position 4 with respect to said azo group, said substituent being a member of the group consisting of hydroxy, amino, arylated amino, alkylated amino and organic sulfonic acid acyl amino groups, and B is an azo coupling component radical selected from the group consisting of aromatic radicals carrying an electronegative substituent of the group consisting of nitro, sulfo, sulfone, sulfamide, carboxylic acid, carboxylic ester, carboxylamide, nitrile, vinyl and azo groups, and a pyrazolone radical, each of said pH sensitive azo dyes being in the aforementioned chiefly transmittant form at the same pH, and in a substantially absorbent form with respect to light waves to which the layer containing such dye is sensitive at another pH, said different pH sensitive azo dyes existing in the absorbent form at the same last mentioned pH.

9. A photographic material including a support and a coating on said support, said coating comprising a plurality of superimposed discrete portions, at least two of said portions each containing a light sensitive silver halide and each predominantly sensitive for light of one of at least two different predetermined spectral regions, each of said two portions containing a different pH sensitive azo dye, each of such pH sensitive azo dyes being chiefly in transmittant form with respect to light waves for which the portion containing said dye is sensitive, each of said pH sensitive azo dyes having the formula A—N=N—B wherein A is an aromatic radical carrying a hydroxy group in position 4 with respect to said azo group, and B is an azo coupling component radical selected from the group consisting of aromatic radicals carrying an electronegative substituent of the group consisting of nitro, sulfo, sulfone, sulfamide, carboxylic acid, carboxylic ester, carboxylamide, nitrile, vinyl and azo groups, and a pyrazolone radical, each of said pH sensitive azo dyes being in the aforementioned chiefly transmittant form at the same pH, and in a substantially absorbent form with respect to light waves to which the portion containing such dye is sensitive at another pH, said different pH sensitive azo dyes existing in the absorbent form at the same last mentioned pH.

10. A photographic material including a support and a coating on said support, said coating comprising a plurality of superimposed discrete portions, at least two of said portions each containing a light sensitive silver halide and each predominantly sensitive for light of one of at least two different predetermined spectral regions, each of said two portions containing a different pH sensitive azo dye, each of such pH sensitive azo dyes being chiefly in transmittant form with respect to light waves for which the portion containing said dye is sensitive, each of said pH sensitive azo dyes having the formula A—N=N—B wherein A is an aromatic radical carrying a dialkylamino group in position 4 with respect to said azo group, and B is an azo coupling component radical selected from the group consisting of aromatic radicals carrying an electronegative substituent of the group consisting of nitro, sulfo, sulfone, sulfamide, carboxylic acid, carboxylic ester, carboxylamide, nitrile, vinyl and azo groups, and a pyrazolone radical, each of said pH sensitive azo dyes being in the aforementioned chiefly transmittant form at the same pH, and in a substantially absorbent form with respect to light waves to which the portion containing such dye is sensitive at another pH, said different pH sensitive azo dyes existing in the absorbent form at the same last mentioned pH.

11. In the process of producing a photographic dye image from a photographic material having at least two light sensitive silver halide emulsion layers each sensitive for light of one of at least two different predetermined spectral regions, and each of said two layers containing a different pH sensitive azo dye, each of such pH sensitive azo dyes being in transmittant form at the same pH to light waves of the region to which the layer containing such dye is sensitive, and absorbent for such light waves at another pH, each of said dyes being absorbent at the same last mentioned pH, each of said dyes having the formula A—N=N—B wherein A is an aromatic radical carrying an electropositive substituent in position 4 with respect to said azo group, said substituent being a member of the group consisting of hydroxy, amino, arylated amino, alkylated amino and organic sulfonic acid acyl amino groups, and B is an azo coupling component radical selected from the group consisting of aromatic radicals carrying an electronegative substituent of the group consisting of nitro, sulfo, sulfone, sulfamide, carboxylic acid, carboxylic ester, carboxylamide, nitrile, vinyl and azo groups, and a pyrazolone radical, the steps which comprise exposing such photographic material to light while the layers containing the pH sensitive azo dyes are at a pH which is compatible with the light sensitive silver halide emulsion and at which each of such dyes is substantially transmittant to the light waves to which the layer containing such dye is sensitive, developing the silver image thus formed, treating said emulsion layers with a dye-bleach solution to form a dye image in said emulsion layers from said pH sensitive azo dyes, removing silver from said layers, and treating said emulsion layers in a solution to adjust the pH of said emulsion layers in the same direction to a pH at which such dyes are substantially absorbent to the light waves to which said two emulsion layers were sensitive during exposure to cause the dyes in the dye image to be in such absorbent form.

12. In a process of producing a multicolor photographic image from a photographic material having three superimposed light sensitive silver halide emulsion layers each being predominantly sensitive for light of different predetermined spectral regions and each layer containing a different pH sensitive azo dye, each of such pH sensitive dyes being transmittant at the same pH to light waves of the region to which the layer containing said dye is sensitive and absorbent for such light waves at another pH, each of said dyes being absorbent at the same last mentioned pH, each of said dyes having the formula A—N=N—B wherein A is an aromatic radical carrying an electropositive substituent in position 4 with respect to said azo group, said substituent being a member of the group consisting of hydroxy, amino, arylated amino, alkylated amino and organic sulfonic acid acyl amino groups, and B is an azo coupling component radical selected from the group consisting of aromatic radicals carrying an electronegative substituent of the group consisting of nitro, sulfo, sulfone, sulfamide, carboxylic acid, carboxylic ester, carboxylamide, nitrile, vinyl and azo groups, and a pyrazolone radical, the first layer containing the red light transmitting form of a pH sensitive cyan azo dye as above defined, the second layer containing the red and green light transmitting form of a pH sensitive magenta azo dye as above defined, and the third upper layer containing the red, green and blue light transmitting form of a pH sensitive yellow azo dye as above defined, the steps which comprise exposing said photographic material to light while the layers containing the pH sensitive dyes are at a pH which is compatible with the light sensitive silver halide emulsion and at which such dyes are substantially transmittant to said light waves, developing the silver image thus formed, fixing said emulsion layers, treating said emulsion layers with a dye-bleach solution to form a dye image in said emulsion layers from said pH sensitive azo dyes, removing silver from said layers, and treating said emulsion layers in an alkaline solution to adjust the pH of said emulsion layers in the same direction to the pH at which such dyes are substantially absorbent to the light waves for which such layers were sensitive during exposure to cause the dyes in the dye image to be in the absorbent form.

References Cited in the file of this patent

UNITED STATES PATENTS

| | | |
|---|---|---|
| 1,926,805 | Gottlieb et al. | Sept. 12, 1933 |
| 1,969,451 | Capstaff | Aug. 7, 1934 |
| 1,985,344 | Gaspar | Dec. 25, 1934 |
| 2,125,015 | Gaspar | July 26, 1938 |
| 2,183,394 | Gaspar | Dec. 12, 1939 |
| 2,231,685 | Seymour | Feb. 11, 1941 |
| 2,301,884 | Carroll | Dec. 15, 1942 |
| 2,428,054 | Vittum et al. | Sept. 30, 1947 |
| 2,434,272 | Jelley et al. | Jan. 13, 1948 |
| 2,470,769 | Gaspar | May 24, 1949 |
| 2,644,753 | Gaspar et al. | July 7, 1953 |
| 2,688,542 | Dreyfuss | Sept. 7, 1954 |

FOREIGN PATENTS

| | | |
|---|---|---|
| 1,549 of 1912 | Great Britain | Jan. 20, 1913 |
| 182,167 | Great Britain | June 21, 1922 |
| 222,523 | Great Britain | Oct. 6, 1924 |

OTHER REFERENCES

Friedman: "History of Color Photography," p. 422, American Photographic Pub. Co., Boston (1944).